Aug. 26, 1952     C. S. MORRISON     2,608,437
TRACTOR MOUNTED SPRAYER

Filed April 17, 1948                      2 SHEETS—SHEET 1

INVENTOR.
CHARLES S. MORRISON
BY
ATTORNEYS

Aug. 26, 1952    C. S. MORRISON    2,608,437
TRACTOR MOUNTED SPRAYER
Filed April 17, 1948    2 SHEETS—SHEET 2

INVENTOR.
CHARLES S. MORRISON
BY
ATTORNEYS

Patented Aug. 26, 1952

2,608,437

UNITED STATES PATENT OFFICE 2,608,437

TRACTOR MOUNTED SPRAYER

Charles S. Morrison, Moline, Ill., assignor to Deere & Company, Moline, Ill., a corporation of Illinois Application April 17, 1948, Serial No. 21,711

8 Claims. (Cl. 299—30)

1

The present invention relates generally to agricultural implements and more particularly to a sprayer for distributing spray materials, such as weed inhibitors and/or destroying chemical solutions and the like.

The object and general nature of the present invention is the provision of a spray attachment adapted to be mounted on a farm tractor. More particularly, it is a feature of this invention to provide a new and improved frame means quickly and readily attachable to the tractor and new and improved spraying means carried thereby. Still further, it is another feature of this invention to provide new and improved means providing for both vertical and rearward swinging of the laterally outwardly extending spray booms, and still further it is another feature of this invention to provide new and improved releasable latching means accommodating the rearward swinging of the laterally outwardly extending spray booms in the event either of them strikes an obstruction or the like when extended.

These and other objects and advantages of the present invention will be apparent to those skilled in the art after a consideration of the following detailed description, taken in conjunction with the accompanying drawings in which the preferred form of the invention has been shown by way of illustration.

In the drawings:

Figure 4 is a fragmentary view of the outrigger hinge mechanism in its position locked for transport.

Figure 1:
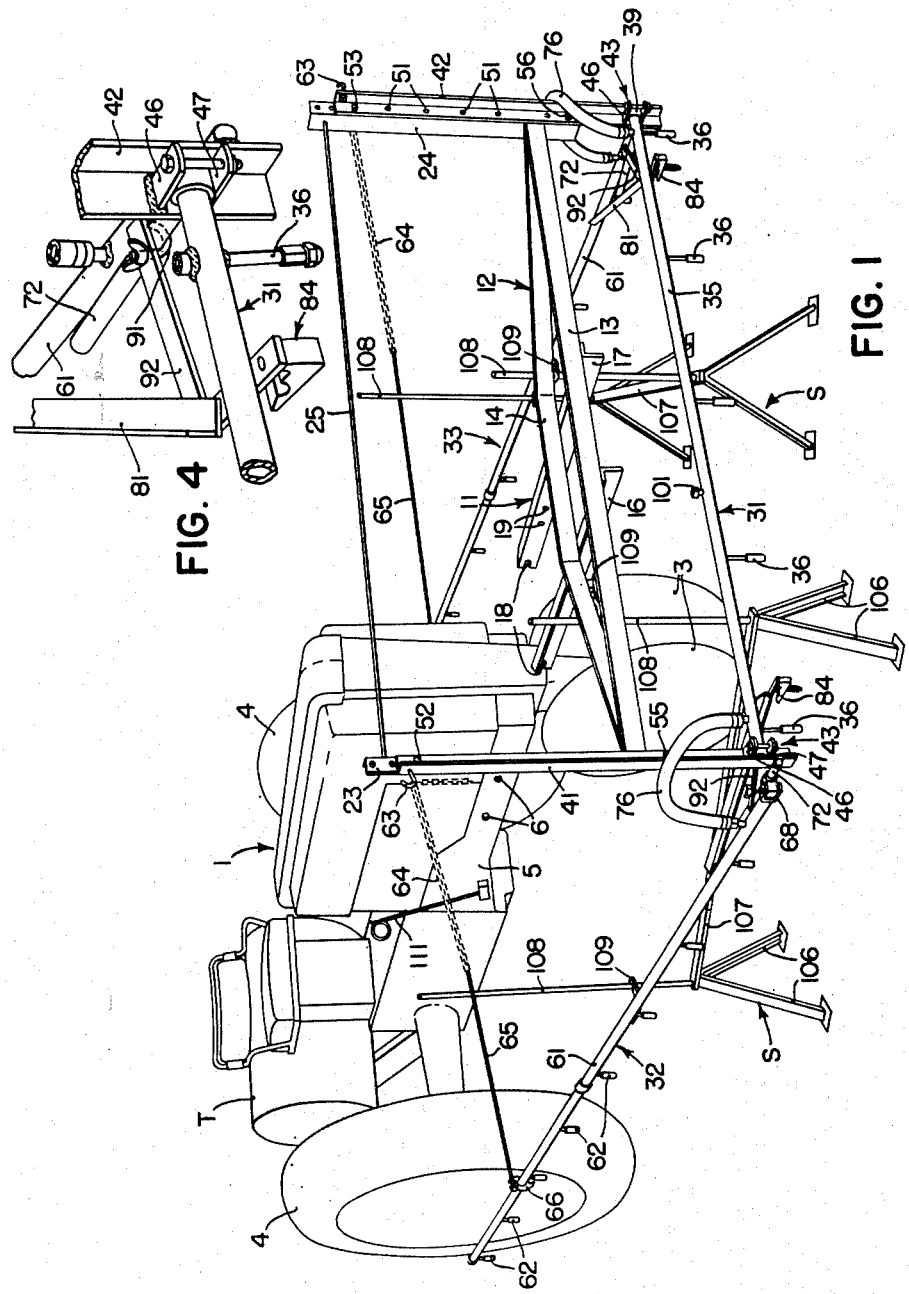
Figure 1 is a perspective view showing the spray attachment in position to be attached to a tractor.

Referring now to the drawings, the tractor on which the spray attachment of the present invention is adapted to be mounted is indicated in its entirety by the reference numeral 1 and includes front wheels 3 and rear wheels 4, and a frame structure which includes side members 5 usually apertured, as at 6, and provided with any suitable means for the attachment of implements and machines thereto.

The spray attachment is indicated in its entirety by the reference numeral 10 and includes a main attaching frame 11. The latter is made up of a transverse frame bar 12 formed by a straight section 13 and a rear bent member 14, the central portion of which is spaced from the straight bar 13 while the ends thereof are secured, as by welding, to the ends of the front bar 13. A pair of longitudinally extending attaching bars 16 and 17 are fixed at their front ends to the cross bars 13 and 14, and the rear portions of the attaching angles 16 and 17 are provided with notches 18 and apertures 19 or other suitable means providing for the firm connection of the two bars 16 and 17 to the sides of the tractor. Preferably, the bars 16 and 17 are spaced apart laterally so as to receive the tractor body therebetween with a fairly close fit whereby bolts 21 or the like may be employed for readily fixing the attachment frame to the tractor in rigid relationship. A pair of upright angles 23 and 24 are rigidly secured, as by welding, near their lower ends to the ends of the front bars 13 and 14, and a tie rod 25 extends transversely across the frame from the upper end of one of the upright bars to the upper end of the other bar.

Figure 3:
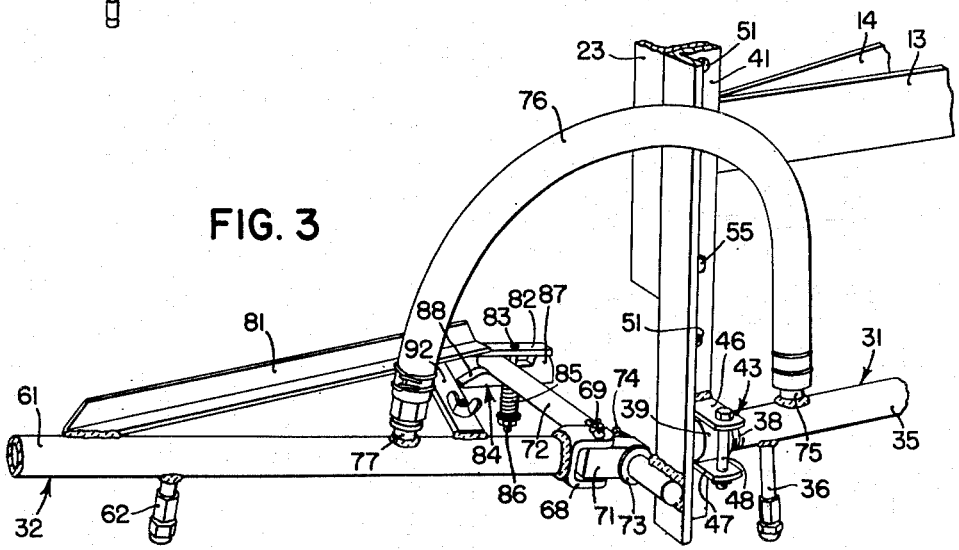
Figure 3 is an enlarged fragmentary perspective view showing the connection between the pivoted spray booms and the central portion of the attachment frame.

The attachment frame 11 supports a central conduit section 31 and a pair of laterally outwardly disposable outer sections 32 and 33. The central section 31 is in the form of a manifold 35 having a plurality of nozzle outlets 36. The pipe 35 is threaded at its outer ends, as indicated at 38 in Figure 3, and is closed by a cap 39. The central section or spray manifold 31 is supported on a pair of vertically extending angles 41 and 42 by means of a pair of cap-receiving clamping units 43. As best shown in Figure 3, the unit 43 includes upper and lower spaced apart resilient lugs 46 and 47 apertured to receive a clamping bolt 48. As best shown in Figure 1 the spray manifold 31 is of such length that the caps 39 are disposed snugly between the respective lugs 46, 47. Thus, when the bolts 48 are tightened the lugs 46 and 47 are brought down firmly against the associated caps to rigidly and positively secure the spray manifold 31 in position without further attaching means. From Figure 3 it will be seen that the bolts 48 are disposed substantially directly in front of the caps 39 and so serve to retain the manifold 31 in position even though the bolts might loosen to the point of failing to clamp the caps tightly in place.

To provide for raising and lowering the manifold 31, as well as the outrigger booms 32 and 33, each of the vertically extending angles 41 and 42 is provided with a plurality of apertures 51 at their upper and lower ends, and the upright angles 23 and 24 are provided with apertures to receive a pair of clamping bolts 52 and 53 at their upper ends and a pair of similar clamping bolts 55 and 56 at the lower ends of the upright angles 23 and 24. By virtue of disposing the bolts 52, 53 and 55, 56 in selected openings 61, the vertically extending angles 41 and 42 may be raised or lowered and fixed in any position of adjustment desired so as to bring the spray manifold and the outrigger booms in the desired position.

Referring now to the outer or outrigger booms 32 and 33, these parts are substantially identical, and hence a description of one will suffice. Each of the spray booms includes a tubular member, preferably in the form of a pipe 61, having lower openings to receive a plurality of nozzles 62 at spaced intervals. A hook 63 is fixed to the upper end of each of the upright angles 41, 42 and receives a chain 64 which at its outer end is connected through a rod 65 to a clamping member 66 fixed to the outer portion of the associated spray boom. The inner end of the pipe 61 is closed by a bifurcated yoke member 68 which, as best shown in Figure 3, is apertured and receives a pivot 69 which passes through a vertical opening in a connection block 71 which is mounted for rocking movement about a generally longitudinally extending axis as defined by a shaft or rod 72 which is securely fixed, as by welding, to the lower end of the associated vertically extending angle. A wear washer 73 is disposed between the block 71 and the adjacent portions of the lower end of the associated upright angle, and a similar washer is placed on the rear side of the block 71 and held in place by a cotter 74 or other suitable means. By virtue of the vertical pivot 69, the boom pipe 61 may swing fore and aft generally about a vertical axis, and by virtue of the pivoting of the block 71 on the shaft section 72, the spray boom 32 is free to swing upwardly and downwardly relative to the tractor about a generally longitudinally extending axis. The boom pipe 61 is connected to receive spray material from the manifold 31, and to this end the latter is provided with a coupling 75 adjacent each end. A flexible hose 76 is connected at its inner end to the coupling 75 and at its outer end to a coupling 77 carried by each of the outrigger boom parts 61. Thus, the flexible connection 76 spans the clamping means for the center spray manifold and the hinge means 68 et al. so as to transmit spray material from the center section outwardly to the outrigger sections.

A brace angle 81 is fixed at its outer end to each of the pipes 61 and at its inner end carries a strap extension 82 which is apertured to receive a bolt 83. The latter extends through a pivoted latch member 84 and a spring 85 is disposed about each bolt 83 and bears between the latch member 84 and an adjusting lock nut 86 on the bolt 83. The latch member 84 is provided with a rounded end portion 87 and bears against the strap extension 82 and defines a fulcrum or pivot about which the latch member 84 may move. The latch member has a rounded nose section 88 which at least partially encircles the rear end of the rod 72, being held in that position by the spring 85. Thus, the latch 84 holds the associated outrigger spray boom in extended position. If, however, either of the spray booms should strike an obstruction in operation the boom may swing rearwardly, the rounded nose portion 88 of the latch 84 being forced inwardly over and away from the rear end of the rod or shaft 72, but after the obstruction is passed the operator may readily restore the boom or booms to normal position merely by swinging the same forwardly, the inclined portion 88 at the outer end of the latch 84 guiding the rear end of the shaft into position, as shown in Figure 3, between the latch 84 and the strap 82. Further, any time that the operator desires to drive through a gate or other narrow way, the booms 32 and 33 may be folded rearwardly and laterally inwardly, and in the position shown in Figure 1, merely by forcing the booms backwardly until the latch 84 is disengaged from the rear end of the associated shaft 72. If it is desired to hold the booms in their rearwardly folded position, a J-bolt 91 on a reenforcing brace 92 connecting the brace 81 and the rear end of the pipe 61 may be engaged with the associated shaft 72 when the boom is extended rearwardly. Spray material is supplied to the manifold 31 through a supply line 100 (Figure 2) which is connected at its forward end with an inlet fitting 101. A tank T is mounted on the rear of the tractor and suitable pump means (not shown) is provided for delivering spray material through the line 100 to the central spray manifold 31 and the two outrigger spray booms 32 and 33.

Figure 2:
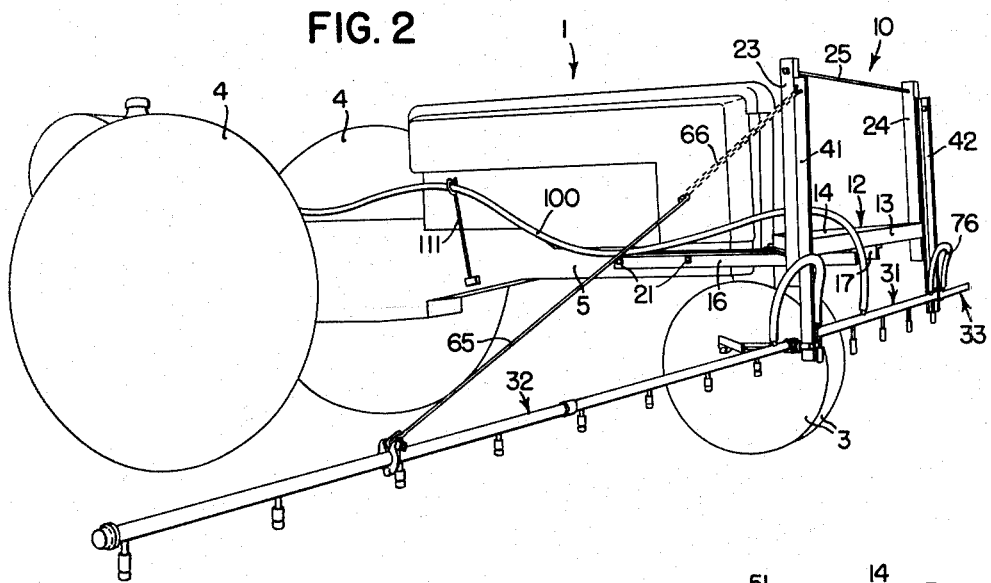
Figure 2 is a perspective view showing the spray attachment fixed in place on the tractor and ready for operation.

For convenience in supporting the unit when detached from the tractor, I provide a pair of stands S. Each of the stands S includes four foot members 106 and a cross bar 107, together with a pair of upright rods 108. Each of the latter members carries a manually adjustable supporting bracket 109 which is apertured to receive the associated rod 108, there being sufficient looseness to accommodate adjustment of the bracket on the rod, but when the outer end of the bracket receives a weight, such as the weight of the boom or the weight of a portion of the frame, the latter is clamped on the associated rod 108 and is held by virtue of such eccentric loading against slipping down on the rod 108. As best shown in Figure 1, two stands are all that is necessary to support the spray attachment. The stands are placed diagonally with the rear bar 14 resting in the forward brackets 109 and with the booms 32 and 33 extended rearwardly and resting in the rear brackets 109. The tractor may then be backed out of the outfit, when detaching the latter, or driven into the outfit when attaching the same to the tractor. It will be noted that when the booms 32 and 33 are swung rearwardly, as shown in Figure 1, the connections between the inner ends of the pipes 61 and the lower ends of the vertically extending bars 41 and 42 are such that the upright bars 23 and 24 as well as the vertically extending bars 41 and 42 are held against tipping forwardly. An auxiliary rod support 111 may be attached to the tractor for supporting the intermediate portion of the supply line 100, as best shown in Figure 2.

Having described my invention in accordance with the statutes, it will be understood that my invention is not to be limited to the particular details shown and described, but that widely different means may be employed in the practice of the broader aspects of my invention.

What I claim, therefore, and desire to secure by Letters Patent is:

1. In a sprayer, a generally rigid supporting frame, conduit means carried thereby, a spray boom, means providing a pivotal connection between the inner end of said boom and said frame to permit said boom to swing back rearwardly if an obstruction is encountered, a flexible conduit section extending from said conduit means to the inner end portion of said spray boom and accommodating swinging of the latter, and spring biased latch means acting between said boom and said frame for yieldably resisting rearward swinging of said boom, a part carried by said frame in rigid relation and disposed adjacent said pivotal connecting means, said spring biasing latch means including a part disposed at one side of said rigidly connected frame-carried part and means yieldably acting against said frame-carried part generally at the other side thereof, said parts cooperating to prevent forward swinging of said boom relative to said conduit means beyond a generally aligned position therewith.

2. A tractor mounted sprayer comprising a central frame attachable to the front end of a tractor so as to move therewith, a generally fore and aft extending bar at each side of said frame, a pivot block swingably mounted on the front portion of each of said bars for movement about a generally fore and aft extending axis, an outrigger member pivoted to each block for movement about a generally vertical axis, a generally rearwardly and inwardly extending arm fixed to each outrigger member, and a releasable latch carried by each of said arms for releasably connecting the latter to said bars and releasably holding said outrigger members in laterally outwardly extending position.

3. In a tractor mounted sprayer, frame means attachable to the tractor and including a pair of laterally spaced apart upright bars, a central conduit fixed to the lower end portions of said upright bars, outrigger pipes one at each side of said frame means, flexible hose lines at the outer ends of said central conduit connecting the latter with the inner end portions of said outrigger pipes, universal joint means mounting the inner ends of said outrigger pipes on the lower ends of said upright bars for swinging movement relative thereto both rearwardly and vertically, a bar fixed to and extending generally rearwardly from the lower end of each of said upright bars, latch mechanism for connecting each of the outrigger pipes with said last mentioned bar when the outrigger pipe is swung rearwardly to a position alongside said frame means, and means acting between the upper ends of said upright bars and the outer ends of said outrigger pipes for holding the outer ends thereof in different vertical positions.

4. In a tractor mounted sprayer, frame means, a central conduit fixed to said frame means, outrigger pipes one at each side of said frame means, flexible hose lines at the outer ends of said central conduit connecting the latter with the inner end portions of said outrigger pipes, a fore and aft extending shaft section fixed to said frame means at each side thereof, a pivot block mounted on each bar for up and down swinging, a head fixed to the inner end of each outrigger pipe and hinged to the associated pivot block for generally fore and aft swinging movement, and means for raising and lowering said outrigger pipes about the axes defined by said fore and aft extending shaft sections.

5. A sprayer comprising mobile supporting means, a frame attachable to said supporting means in a generally transverse position relative to the direction of travel, a generally fore-and-aft extending member fixed at its forward end to said frame, one at each side thereof, an outrigger member at each side of said frame, means connecting the inner end of each outrigger member to said frame for both vertical and horizontal swinging relative thereto, the associated fore-and-aft extending member being disposed adjacent the axis of vertical swinging, a generally rearwardly and inwardly extending arm fixed to each outrigger member, and a releasable latch carried by each of said arms for releasably connecting the latter to said fore-and-aft extending members and releasably holding said outrigger members in laterally outwardly extending position.

6. A sprayer as defined in claim 5, further characterized by each of said arms extending laterally inwardly beyond the rear end of the associated fore-and-aft extending member, and the releasable latch carried by said arm being disposed laterally inwardly of the associated fore-and-aft extending member, whereby said latch means prevents any swinging of the associated outrigger member forwardly of its laterally outwardly extending position.

7. A sprayer as defined in claim 5, further characterized by each of said latches being rotatable on the associated fore-and-aft extending members when said outrigger members are raised.

8. A sprayer comprising mobile supporting means, a frame attachable to said supporting means in a generally transverse position relative to the direction of travel, a generally fore-and-aft extending member fixed at its forward end to said frame, one at each side thereof, an outrigger member at each side of said frame, means connecting the inner end of each outrigger member to said frame for both vertical and horizontal swinging relative thereto, the associated fore-and-aft extending member being disposed adjacent the axis of vertical swinging, and releasable means carried by each of said arms and engageable with the associated fore-and-aft extending member for holding said outrigger members in rearwardly extended position.

CHARLES S. MORRISON.

REFERENCES CITED

The following references are of record in the file of this patent:

UNITED STATES PATENTS

| Number | Name | Date |
| --- | --- | --- |
| 978,082 | Wallace | Dec. 6, 1910 |
| 1,341,113 | Dottl et al. | May 25, 1920 |
| 1,470,246 | Willis et al. | Oct. 9, 1923 |
| 1,963,908 | Manasek | June 19, 1934 |
| 2,169,948 | Gallupe | Aug. 15, 1939 |
| 2,273,344 | Black et al. | Feb. 17, 1942 |
| 2,305,913 | Troyer | Dec. 22, 1942 |

FOREIGN PATENTS

| Number | Country | Date |
| --- | --- | --- |
| 767,240 | France | May 1, 1934 |
| 781,039 | France | Feb. 18, 1935 |